June 24, 1958

C. SCHNELL 2,840,318

COMMINUTING MACHINE HAVING PERFORATED PLATE
AND ROTARY CUTTER

Filed March 19, 1956

INVENTOR
Carl Schnell

BY
ATTORNEY

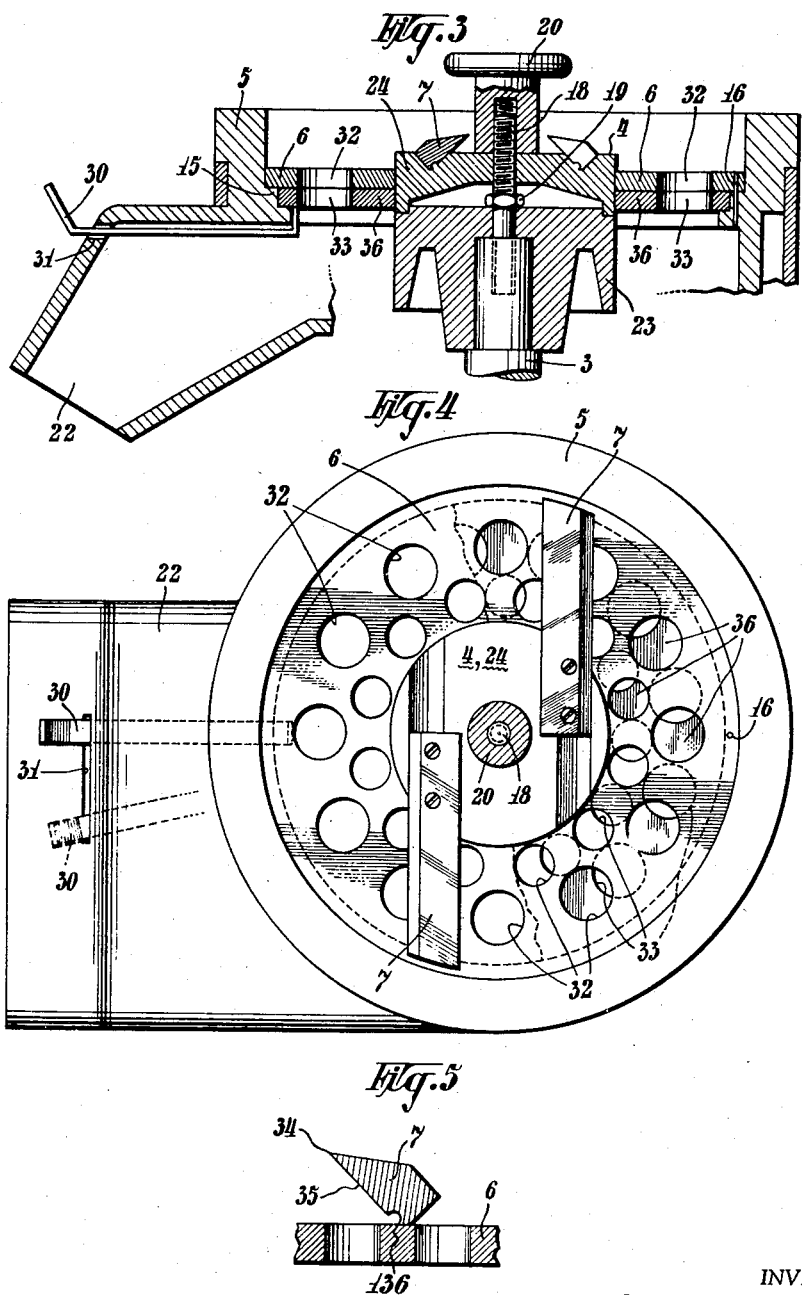

June 24, 1958  C. SCHNELL  2,840,318
COMMINUTING MACHINE HAVING PERFORATED PLATE
AND ROTARY CUTTER
Filed March 19, 1956  3 Sheets-Sheet 3
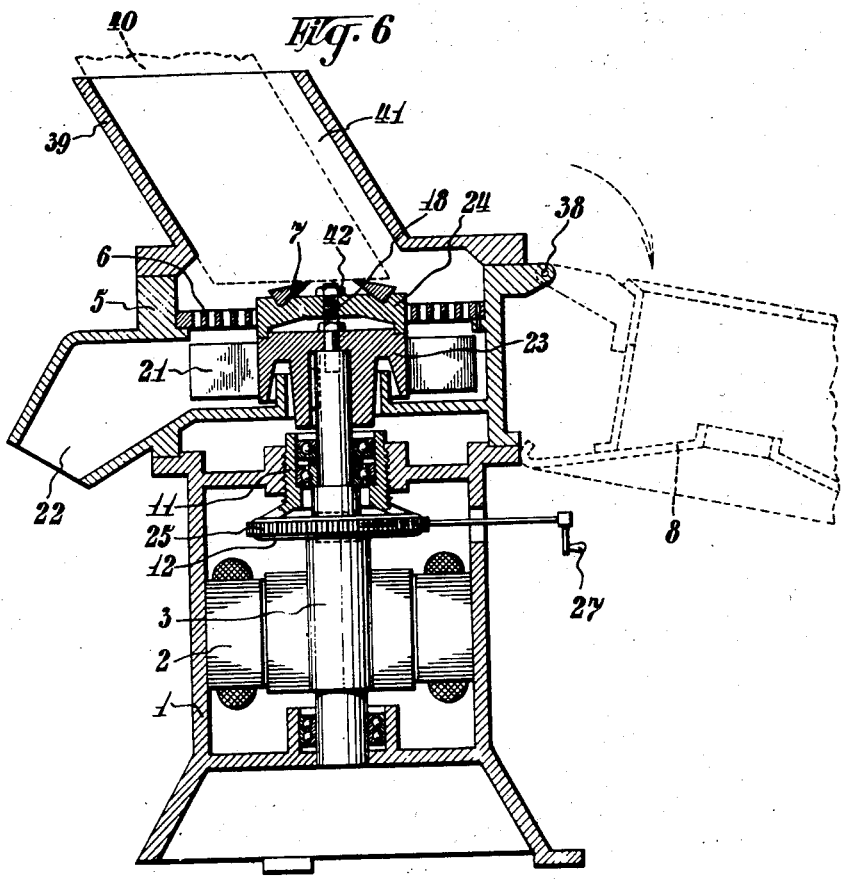
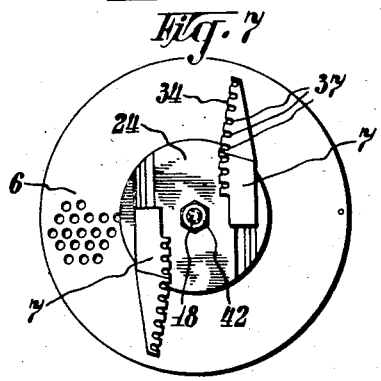
INVENTOR
Carl Schnell
BY
ATTORNEY

United States Patent Office 2,840,318
Patented June 24, 1958

2,840,318

COMMINUTING MACHINE HAVING PERFORATED PLATE AND ROTARY CUTTER

Carl Schnell, Winterbach, near Schorndorf, Germany, assignor of one-half to The Griffith Laboratories, Inc., Chicago, Ill., a corporation Application March 19, 1956, Serial No. 572,543

2 Claims. (Cl. 241—84)

This invention relates to a comminuting machine having a rotating cutter head, and which is suitable primarily for the production of fodder in agricultural installations but which is also suitable for the production of meat products, for example for sausages.

The invention consists in that one or a plurality of cutters are disposed on the cutter head, which is driven by motor, the top edge of said cutters serving as rough cutters and the bottom edge as fine cutters, the cutters being so shaped that the material to be comminuted is pressed against a slotted or perforated plate disposed beneath the cutter head. The fine cutting edge of the individual cutter moves over the slotted or perforated plate with so small a clearance that the material is finely cut up or ground by the fine cutting edge as said material passes through the slots or holes in the plate. The two cutting edges of the individual cutter first effect a coarse comminution and then in collaboration with the slotted or perforated plate, a fine comminution.

The said perforated disc can be changed, according to particular requirements, for other discs having holes with a larger or smaller diameter. Furthermore, it is possible to adjust the cutters in relation to the perforated plate, on the one hand in order to adapt the distance between the cutter and the perforated plate to the kind of material to be comminuted and on the other hand in order to enable the desired and requisite distance from the perforated plate to be readjusted when the cutters wear. Adjustment of the cutters is effected by moving the cutter head axially, preferably by moving axially the parts which are rigidly joined to the cutter head.

For the purpose of regulating the fineness of the comminution, the cross-section of the perforations through which the material passes may be varied in another manner instead of changing the individual perforated plates. For example, two perforated or slotted plates are disposed one above the other, the second plate being mounted rotatably beneath the first plate, which is held fast.

In the manufacture of sausage meat, in addition to comminuted meat and other butcher's by-products, use is also made of comminuted ice or ice snow. In order to enable the comminuting machine to be used for the production of ice snow as well, the charging hopper for the material to be comminuted, which hopper is disposed above the cutter head on the machine, is adapted to be changed for a guide for the bar of ice to be comminuted. The bar of ice is comminuted to form ice snow by the rotating cutters and the other devices of the machine. The charging hopper is preferably connected to the machine housing pivotally and so as to be capable of being rocked away to the side, so that after said hopper has been rocked away the guide for the bar of ice can be attached to the machine housing.

Finally, the invention also consists in that the cutting edge of the individual cutters of the cutter head is constructed to be toothed. Toothed cutting edges have the advantage that rind, sinews and the like can also be satisfactorily comminuted.

Exemplified embodiments are shown in the drawing.

Figure 3 is a detail of Figure 1, but with two slotted or perforated plates disposed one above the other, on an enlarged scale.

Figure 4 is a plan view of Figure 3 with a portion of the bottom plate broken away.

Figure 5 is a partial cross-section according to Figure 2, on an enlarged scale.

Figure 6 is a longitudinal section of the machine with the guide for the bar of ice attached.

Figure 7 is a plan view of the cutter head together with the perforated disc.

Figure 1:
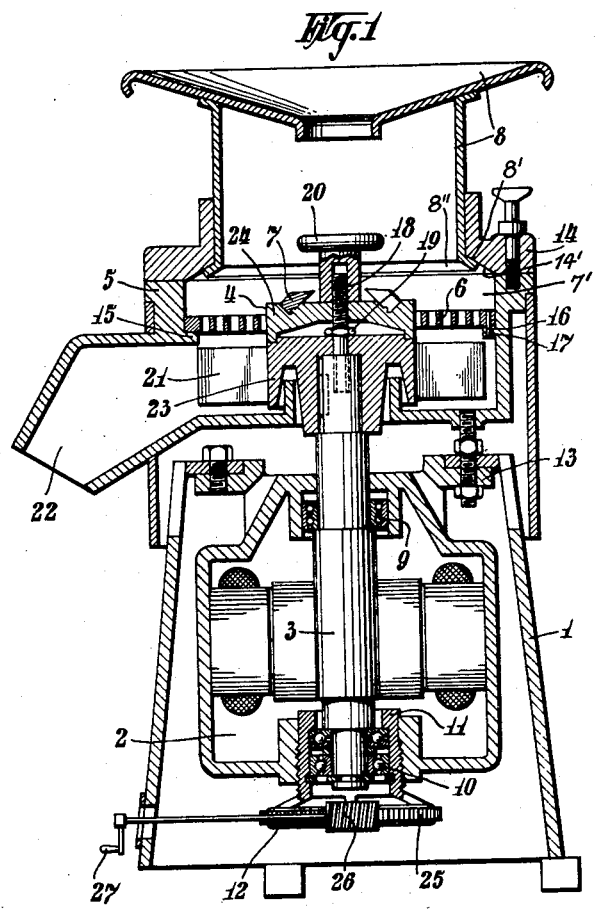
Figure 1 is a longitudinal section of a comminuting machine.

A flanged motor 2, on the shaft 3 of which is mounted a cutter head 4 with the cutters 7, is disposed in the frame 1. The housing 5 is rigidly joined to the frame 1 and the motor flange 13. Said housing 5 carries the charging hopper 8, which is fastened by means of a flange 14. The flange 14 is spaced at a height above the tops of cutters 7 and rests on the walls 5 of a cylindrical chamber in which said cutters rotate. Flange 14 has an upwardly and inwardly sloping internal wall 14' connecting with an external cylindrical wall 8' of the charging hopper 8, forming together with the inner wall portion 8" a frusto-conical section above the space 7' in which the cutters 7 revolve. The surfaces 14' and 8" cooperatively define an inclined recirculating surface in a plane slightly above the plane of the cutting arms as it rotates in the chamber 7'. This inclined, substantially frusto-conical surface joins the chamber 7' and the charging hopper 8. The housing 5 has an annular shoulder 15, which supports the perforated plate 6. The latter is secured against turning by means of a shear pin 16, which is inserted in the perforated plate 6 on the one hand and in a projection 17 on the housing 5 on the other hand. The shear pin 16 can shear, for example if stones or iron parts are fed in, in order thus to prevent the machine from being damaged. The cutter head 4 comprises the bottom part 23, which is joined fast to the shaft 3, and the top part 24, which is fastened to the bottom part by means of a screw 18. The screw 18 at the same time joins the shaft 3 to the bottom part 23 of the cutter head 4, a locknut 19 also being used. To the top part 24 is fastened a nut 20, which is joined to a rotary handle and which is screwed to the screw 18. The perforated plate 6 is changed by removing the screw 20 with the top part 24 of the cutter head 4, whereupon the perforated plate 6 is lifted out and replaced by another. The shear pin 16 is not secured in the vertical direction, so that this affords no obstruction. The bottom part 23 of the cutter head 4 is also joined to the strippers 21, by means of which the comminuted material is pressed into the outlet 22. The shaft 3 is mounted in the motor 2 in bearing 9 on the one hand and in the thrust bearing 10 on the other hand. The bearing 10 is in turn disposed in a hollow nut 11, which is adjustable in the axial direction in the housing of the motor 2. Adjustment is effected by the wheel 12, which may either be constructed as a handwheel or, as shown in the example illustrated, have a toothed rim 25 which is adapted to rotate through a worm 26 by means of a hand crank 27. By the axial displacement of the shaft 3 the cutter head 4 with the cutters 7 is moved, so that the distance of the cutters 7 from the slotted or perforated plate 6 can be adjusted to requirements. Since the motor shaft 3 is displaced within relatively small limits, the rotor can be displaced with it at the same time without impairing the operation of the motor 2. The adjusting means 12, 25, 26, 27 may also be disposed at the top of the motor housing, as shown is Figure 6.

Figure 2:
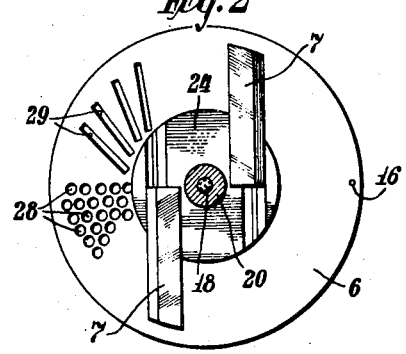
Figure 2 is a plan view of a slotted or perforated plate with the cutters, showing different types of construction of the apertures.

The slotted or perforated plate 6 in Figure 2 has both holes 28 and slots 29, to show the possibilities which exist for the construction of such a plate.

Figure 3 shows another type of construction, in which two perforated plates are used. The top perforated or slotted plate 6 is held by the shear pin 16 in the same way as in the construction shown in Figure 1. The second perforated or slotted plate 36 is provided beneath it. The two plates 6 and 36 have an identical arrangement, position and shape for the holes 32, 33, so that they can be made to coincide. The bottom plate 36 is disposed loosely and can be moved through a determined angle by means of the adjusting lever 30, which extends through a slot 31 in the outlet opening 22. Owing to the fact that the bottom perforated plate 36 is adjustable into a determined angle, the holes 32 and 33 are either superimposed, as shown on the left-hand side of Figure 4 or, as shown in the right-hand side of Figure 4, they are offset a certain amount so that only a small passage of material is possible.

Figure 5 shows the exact shape of the cutter 7 in cross-section. The top cutting edge 34 carries out the coarse rough cutting of the material, which is pressed against the perforated plate 6 by the inclined face 35 of the cutter following the edge 34, and which is finely cut up or ground by the bottom cutting edge 136. As shown in Figure 5 a niche is provided above the lower cutting edge 136 of each cutter 7. In order that the edge 136 function as a knife-edge to cut, the face 35 is recessed by the niche to form an acute angle for the cutting edge 136. The remaining flat face designated 35 serves as a propeller to crowd material into position to be cut by the edge 136.

While Figure 2 shows cutters 7 with straight cutting edges 34, the latter may, as shown in Figure 7, also be provided with small recesses or tooth gaps 37, thus producing a toothed cutting edge. A toothed cutting edge is particularly suitable for comminuting rind, sinews and similarly tough parts of meat, and also for making ice snow.

In the form of construction shown in Figure 6, the charging hopper 8 shown in Figure 1 is joined to the machine housing 5 by means of a bolt 38 so as to be pivotally connected and adapted to swing away to the side. In Figure 6 the hopper 8 is shown in the swung away position in broken lines. A guide 39 for a bar of ice is attached to the top of the machine housing 5 and is detachably joined to said housing by screws (not shown). The guide 39 consists, in the example shown, of a shaft for the bar of ice 40, which is shown in broken lines. Said shaft is disposed at an angle to the axis of the cutter head. Moreover, the clear width of the shaft guide 39 is larger than the corresponding cross-section of the bar of ice 40, so that there is a relatively large intermediate space 41 between the bar of ice and the shaft 39. Instead of the hand nut 20 shown in Figure 1 for fastening the cutter head 23, 24, in Figure 6 a low nut 42 is disposed at the top on the cutter head part 24, and lies below the horizontal plane in which the top cutting edges 34 of the cutters 7 rotate. The cutters 7 are held fast by screws inserted from below in the cutter head part 24, said screws fitting from below in threaded holes in the cutters 7.

The bar of ice 40 is comminuted by the rotating cutters 7. The small pieces of ice are pressed downward against the perforated plate 6 by the inclined surfaces 35 of the cutters, and are further comminuted by the bottom cutting edges 136 on passing through the holes in the plate 6 so that ice snow ready for use emerges at 22.

Since in the example illustrated the cutter head directly above the screw fastening 18, 42 does not act on the bar of ice, the inclined guide 39 and the clearance 41 inside the shaft ensure that the bar of ice can move or slide in the horizontal plane to a certain extent, thus guaranteeing complete comminution of the ice. The ice guide 39 could of course also be disposed vertically, in which case for example the nut 42 would be constructed as a milling cutter or the like.

I claim:

1. A comminuting machine comprising wall means defining a substantially cylindrical chamber, a perforated plate forming the bottom of said chamber and at least one rotary cutting arm movably contacting said plate and having an upwardly inclined forward surface, said chamber having an inwardly and upwardly inclined recirculating surface, said inclined surface being in a plane which is slightly above the plane of said cutting arm.

2. A comminuting machine as defined in claim 1, further characterized by the substantially cylindrical chamber underlying an upper charging hopper having a lower substantially cylindrical portion of lesser diameter than said substantially cylindrical chamber, and said inclined recirculating surface being substantially frusto-conical to join said chamber to said charging hopper.

References Cited in the file of this patent

UNITED STATES PATENTS

| | | |
|---|---|---|
| 639,152 | Cox | Dec. 12, 1899 |
| 1,600,123 | Milici et al. | Sept. 14, 1926 |
| 1,647,196 | Rollman | Nov. 1, 1927 |
| 1,796,677 | Wilson | Mar. 17, 1931 |
| 2,183,114 | Bonapace | Dec. 12, 1939 |
| 2,223,739 | Newton | Dec. 3, 1940 |
| 2,665,725 | Lundell | Jan. 12, 1954 |

FOREIGN PATENTS

| | | |
|---|---|---|
| 406,734 | Great Britain | Mar. 2, 1934 |